(12) United States Patent
Harris et al.

(10) Patent No.: US 9,593,049 B2
(45) Date of Patent: Mar. 14, 2017

(54) METHOD FOR INCORPORATING REFRACTORY METAL ELEMENT INTO CERAMIC MATRIX COMPOSITE

(71) Applicants: Rolls-Royce High Temperature Composites Inc., Huntington Beach, CA (US); Rolls-Royce Corporation, Indianapolis, IN (US)

(72) Inventors: Stephen I. Harris, Long Beach, CA (US); Sungbo Shim, Irvine, CA (US); Robert J. Shinavski, Mission Viejo, CA (US); Sean E. Landwehr, Avon, IN (US)

(73) Assignees: Rolls-Royce High Temperature Composites, Inc., Cypress, GA (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 15/049,712

(22) Filed: Feb. 22, 2016

(65) Prior Publication Data

US 2016/0244370 A1 Aug. 25, 2016

Related U.S. Application Data

(60) Provisional application No. 62/118,784, filed on Feb. 20, 2015.

(51) Int. Cl.
*C04B 35/565* (2006.01)
*C04B 35/58* (2006.01)
(Continued)

(52) U.S. Cl.
CPC ...... *C04B 35/58092* (2013.01); *C04B 35/565* (2013.01); *C04B 35/62828* (2013.01); *C04B 35/806* (2013.01); *C04B 2235/3256* (2013.01); *C04B 2235/3258* (2013.01); *C04B 2235/3826* (2013.01); *C04B 2235/428* (2013.01); *C04B 2235/5244* (2013.01);
(Continued)

(58) Field of Classification Search
CPC .... C04B 35/565; C04B 35/573; C04B 35/575
See application file for complete search history.

(56) References Cited

U.S. PATENT DOCUMENTS 4,157,409 A * 6/1979 Levitt ..................... C22C 47/04
427/299
4,273,745 A * 6/1981 Laferty ................ C01G 39/003
423/11
(Continued)

OTHER PUBLICATIONS

Tiegs, T.N., "Diffusion Resistant, High-Purity Wafer Carriers for SI Semiconductor Production", CRADA Final Report for CRADA No. ORNL 98-0538, dated Oct. 2000, pp. 1-15.

*Primary Examiner* — Noah Wiese
(74) *Attorney, Agent, or Firm* — Barnes & Thornburg LLP

(57) ABSTRACT

A method of forming a ceramic matrix composite are described herein. The method may include infiltrating a fiber preform with a solution comprising a refractory precursor in solution with a solvent. The refractory precursor may include a compound having at least one refractory metal element. The method may further include removing the solvent from the fiber preform, and reducing the refractory precursor to form a refractory metal that includes the refractory metal element.

18 Claims, 4 Drawing Sheets

(51) Int. Cl.
*C04B 35/628* (2006.01)
*C04B 35/80* (2006.01)

(52) U.S. Cl.
CPC .. *C04B 2235/616* (2013.01); *C04B 2235/652* (2013.01); *C04B 2235/6582* (2013.01); *C04B 2235/661* (2013.01); *C04B 2235/77* (2013.01); *C04B 2235/80* (2013.01)

(56) References Cited

U.S. PATENT DOCUMENTS

| | | | |
|---|---|---|---|
| 4,376,803 A * | 3/1983 | Katzman | C22C 49/14 427/226 |
| 4,576,836 A * | 3/1986 | Colmet | C04B 35/488 188/251 A |
| 4,626,516 A * | 12/1986 | Morelock | C04B 35/565 501/90 |
| 4,793,859 A | 12/1988 | Morelock | |
| 4,889,686 A | 12/1989 | Singh et al. | |
| 4,981,822 A | 1/1991 | Singh et al. | |
| 5,079,195 A | 1/1992 | Chiang et al. | |
| 5,552,352 A | 9/1996 | Brun et al. | |
| 5,573,377 A | 11/1996 | Bond et al. | |
| 5,633,081 A * | 5/1997 | Clough | C03C 17/27 428/331 |
| 5,795,837 A | 8/1998 | Wei et al. | |
| 5,854,154 A * | 12/1998 | Radford | C04B 35/624 264/621 |
| 5,962,103 A | 10/1999 | Luthra et al. | |
| 5,990,025 A | 11/1999 | Suyama et al. | |
| 6,024,898 A | 2/2000 | Steibel et al. | |
| 6,074,750 A | 6/2000 | Brun et al. | |
| 6,110,527 A | 8/2000 | Brun et al. | |
| 6,228,922 B1 * | 5/2001 | Wang | C08K 3/08 524/413 |
| 6,258,737 B1 | 7/2001 | Steibel et al. | |
| 6,277,440 B1 * | 8/2001 | Reynolds | C04B 35/806 427/226 |
| 6,365,233 B1 | 4/2002 | Corman et al. | |
| 6,403,158 B1 | 6/2002 | Corman | |
| 6,444,271 B2 | 9/2002 | Wittenauer et al. | |
| 6,773,528 B2 | 8/2004 | Tani | |
| 6,793,873 B2 | 9/2004 | Gadow et al. | |
| 6,872,374 B2 | 3/2005 | Song et al. | |
| 7,329,101 B2 | 2/2008 | Carper et al. | |
| 7,736,554 B2 | 6/2010 | Thebault et al. | |
| 8,323,796 B2 | 12/2012 | Schmidt et al. | |
| 8,475,695 B2 | 7/2013 | Carper et al. | |
| 2007/0292690 A1 | 12/2007 | Schmidt | |
| 2008/0124479 A1 | 5/2008 | Hazel et al. | |
| 2012/0177831 A1 * | 7/2012 | Dawes | C04B 35/14 427/384 |
| 2013/0167374 A1 | 7/2013 | Kirby et al. | |
| 2014/0272344 A1 | 9/2014 | Wan et al. | |

\* cited by examiner

METHOD FOR INCORPORATING REFRACTORY METAL ELEMENT INTO CERAMIC MATRIX COMPOSITE

CROSS REFERENCE TO RELATED APPLICATIONS

This application claims priority to and the benefit of U.S. Provisional Patent Application No. 62/118,784, filed 20 Feb. 2015, the disclosure of which is now expressly incorporated herein by reference.

FIELD OF THE DISCLOSURE

The present disclosure relates generally to gas turbine engines, and more specifically to ceramic matrix composite components.

BACKGROUND

Gas turbine engine components are exposed to high temperature environments with an increasing demand for even higher temperatures. Economic and environmental concerns relating to the reduction of emissions and the increase of efficiency are driving the demand for higher gas turbine operating temperatures. In order to meet these demands, temperature capability of the components in hot sections such as blades, vanes, blade tracks, seal segments and combustor liners may be increased.

Ceramic matrix composites (CMCs) may be a candidate for inclusion in the hot sections where higher gas turbine engine operating temperatures are required. One benefit of CMC engine components is the high-temperature mechanical, physical, and chemical properties of the CMCs which allow the gas turbine engines to operate at higher temperatures than current engines.

One possible method of manufacturing dense CMC bodies may include infiltration of a porous, rigidized fiber preform. The method may involve the infiltration of silicon carbide (SiC) particulate filled slurry. The silicon carbide from the slurry may reduce the volume fraction of remaining porosity. Liquid silicon may then be infiltrated into the remaining porosity to form a dense CMC body.

SUMMARY

The present disclosure may comprise one or more of the following features and combinations thereof.

According to an aspect of the present disclosure, a method of forming a ceramic matrix composite may include infiltrating a fiber preform with a solution comprising a refractory precursor in solution with a solvent. The refractory precursor may include a compound having at least one refractory metal element. The method may further include removing the solvent from the fiber preform, and reducing the refractory precursor to form a refractory metal that includes the refractory metal element.

In some embodiments, the method may further include melt infiltrating the fiber preform with a molten silicon containing metal or alloy to form the ceramic matrix composite. At least some of the refractory metal may form a silicide as a result of the melt infiltration. For example, the silicide may include $MoSi_2$, $WSi_2$ or a combination thereof.

In some embodiments, the solvent may include $H_2O$. Moreover, the solvent may further comprises $H_2O_2$ or $H_2PO_4$ or a combination thereof. The refractory precursor may dissociate in the solvent. The removing the solvent may include heating the fiber preform.

In some embodiments, the fiber preform may include silicon containing refractory fibers. For example, the silicon containing refractory fibers may include silicon carbide.

In some embodiments, the reducing the refractory precursor may include reducing the refractory precursor to form a refractory oxide and reducing the refractory oxide to form the refractory metal. The refractory precursor may include $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.

In some embodiments, the refractory metal element may include molybdenum, tungsten or a combination thereof. The refractory metal element may include at least 20% by weight of the solution.

In some embodiments, the method may further include infiltrating the fiber preform with a slurry substantially without the refractory precursor prior to the infiltrating the fiber preform with the solution. The infiltrated slurry may restrict infiltration of the solution into an interior region of the fiber preform.

In some embodiments, the solution may be selectively applied to the fiber preform so that the solution infiltrates only a select region or regions of the fiber preform. For example, the solution may be applied by dip coating, spray-on, brush technique or a combination thereof.

According to another aspect of the present disclosure, a ceramic matrix composite may be manufactured by the method described herein.

According to a further aspect of the present disclosure, a fiber preform article may include silicon containing refractory fibers and a refractory precursor coating the refractory fibers. The refractory precursor may include a refractory metal oxide having a hydrate group.

These and other features of the present disclosure will become more apparent from the following description of the illustrative embodiments.

DETAILED DESCRIPTION OF THE DRAWINGS

Figure 1:
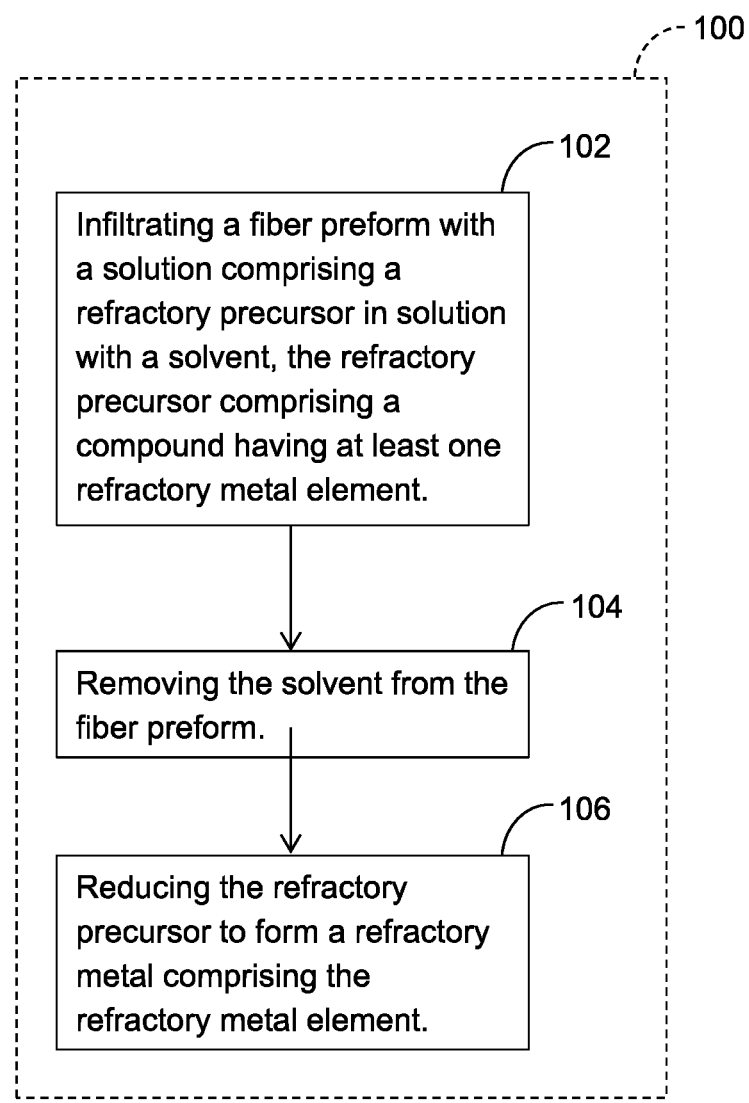
FIG. 1 is a flowchart of an example method of forming a CMC that includes a refractory metal element.

For the purposes of promoting an understanding of the principles of the disclosure, reference will now be made to a number of illustrative embodiments illustrated in the drawings and specific language will be used to describe the same.

Described herein are methods of incorporating one or more refractory metal elements such as molybdenum, tungsten or a combination thereof into a CMC. During the formation of a silicon containing CMC, residual silicon metal may remain after forming of the CMC has been completed. The residual silicon metal is a metallic phase with a major constituent being silicon. The residual silicon metal may be detrimental to high temperature mechanical properties due to the melting point of silicon metal being lower than the melting point of other majority phases present in the CMC. The addition of a refractory metal element to the CMC may result in a reduction in the amount of residual silicon metal in the CMC because the refractory metal element may form a silicide with the residual silicon metal. High temperature (e.g., >1200° C.) mechanical properties such as in-plane tension and environmental resistance such as oxidation may be improved since the silicide may have a melting point higher than the melting point of silicon metal.

FIG. 1 is an example method 100 of forming a ceramic matrix composite. As shown by operational block 102, the method 100 may include infiltrating a fiber preform with a solution. The fiber preform may include refractory fibers such as ceramic fibers. The ceramic fibers may include silicon containing refractory fibers such as silicon carbide. The silicon containing refractory fibers may further include one or more distinct layers. For example, the silicon containing refractory fibers may include a silicon carbide core fiber with a silicon carbide coating. The silicon containing refractory fibers may further include a layer of boron nitride between the silicon carbide core and a silicon carbide coating. The fiber preform may be formed from stacking a plurality of weaved sheets of refractory fibers or the fiber preform may be formed from a three-dimensional weave of refractory fibers.

The fiber preform may have voids or porosity between the fibers that may be infiltrated with the solution. The solution may include a refractory precursor in solution with a solvent. The solvent may include a composition in which the refractory precursor goes into solution with the solvent. For example, the solvent may include $H_2O$. The solvent may further include $H_2O_2$ or $H_2PO_4$ or a combination thereof.

The refractory precursor may include a compound having at least one refractory metal element. The refractory metal element may include molybdenum, tungsten or a combination thereof. The refractory precursor may dissociate in the solvent. For example, the refractory precursor may be a refractory metal oxide having a hydrate group. Examples of refractory precursors include $(NH_4)_2Mo_2O_7$, $(NH_4)_6Mo_7O_{24}.4H_2O$, $(NH_4)_2MoO_4$, $(NH_4)_{10}(H_2W_{12}O_{24}).4H_2O$ or a combination thereof. The refractory metal element may be at least about 10% by weight of the solution or may be at least about 20% by weight of the solution. For example, the refractory metal element may be between about 10% and about 70% by weight of the solution.

The solution may be infiltrated into the fiber preform by submerging the fiber preform into the solution. A negative pressure such as a vacuum may be applied to the fiber preform prior to submersion. After submerging of the fiber preform into the solution, the negative pressure may be removed to increase infiltration rate. The infiltration of the solution may be limited such that only an outer region of the fiber preform is infiltrated with the solution. For example, the solution may be selectively applied to the fiber preform so that the solution infiltrates only a select region or regions of the fiber preform. Additional methods of infiltrating the solution may include dip coating, spray-on, brush technique or a combination thereof.

As shown by operational block 104 of FIG. 1, the method 100 may include removing the solvent from the fiber preform. The removal of the solvent may include exposing the preform to atmospheric conditions. However, the removal rate of the solvent may be increased by applying a negative pressure to the fiber preform, heating the fiber preform or a combination thereof.

Prior to or subsequent to infiltrating the fiber preform with the solution, the fiber preform may be infiltrated with a slurry. The slurry may include particles such as silicon carbide, carbon or a combination thereof. Furthermore, the slurry may include substantially zero amount of the refractory precursor. For example, the slurry may include less than about 1% by weight of refractory precursor. However, the slurry may include particles that comprise a refractory metal element, or the slurry may include substantially zero refractory metal element such as less than about 1% by weight of a refractory metal element. The slurry may include a liquid such as water in which the particles are suspended within. The slurry may be infiltrated into the fiber preform prior to infiltrating the solution into the fiber preform to selectively restrict infiltration of the solution into an interior region of the fiber preform. Thus, the solution may not be present in the interior region. After infiltration of the slurry into the fiber preform, the liquid of the slurry may be removed by evaporation of the liquid.

As shown by operational block 106, the method 100 may include reducing the refractory precursor to form a refractory metal comprising the refractory metal element. As described above, the refractory metal element may include molybdenum, tungsten or a combination thereof. Thus, the refractory metal may include molybdenum metal, tungsten metal or a combination thereof.

The reducing of the refractory precursor may be performed with one or more steps. In one example, reducing the refractory precursor may include reducing the refractory precursor to form a refractory oxide and reducing the refractory oxide to form the refractory metal. Reducing the refractory precursor to the refractory oxide may include heating the refractory precursor in an oxygen containing environment to a sufficient temperature to form the refractory oxide. For example, the oxygen containing environment may be air of standard atmospheric composition. The temperature may be between about 400 and about 500° C. The reducing the refractory oxide to form the refractory metal may include heating the refractory oxide in a hydrogen containing environment to a sufficient temperature to form the refractory metal. The hydrogen containing environment may have a hydrogen partial pressure between about 0.05 and about 0.5. The temperature may be between about 900 and about 1200° C. The reducing the refractory oxide may include more than one step as well. For example, $MoO_3$ may be first reduced to $MoO_2$ or $Mo_2O_5$ prior to being reduced to the molybdenum metal.

After the reducing of the refractory precursor to form the refractory metal, the refractory metal may be embedded between the fibers of the fiber preform. For example, the refractory metal may be particles distributed within the fibers or the refractory metal may coat the fibers.

The method of forming the CMC may further include melt infiltrating the fiber preform with a molten silicon containing metal or alloy to form the ceramic matrix composite. The molten silicon may have a majority constituent being silicon. The melt infiltrating may be performed after the refractory metal has been formed in the fiber preform. The molten silicon may form silicon carbide with carbon in the fiber preform such as with carbon particles from the slurry. The molten silicon may further form a silicide with the refractory metal. Thus, at least some of the refractory metal may form a silicide as a result the melt infiltration. The silicide may include $MoSi_2$, $WSi_2$ or a combination thereof.

The reducing of the refractory precursor may at least be partially performed during the melt infiltration step. For example, the refractory precursor may be reduced to a refractory metal carbide prior to the melt infiltration step. The reducing the refractory precursory to a refractory metal carbide may include heating the refractory precursor in a hydrocarbon containing environment to a sufficient temperature to reduce the refractory precursory to the refractory metal carbide. The temperature may be between about 900 and about 1150° C. The environment may have a hydrocarbon partial pressure between about 0.05 and about 0.5. Examples of possible hydrocarbons may include methane and ethane. The refractory metal carbide may be reduced to a refractory metal prior to melt infiltration or may not be. For example, the fiber preform may be infiltrated having a refractory metal carbide instead of the refractory metal. The liquid silicon metal or alloy can reduce the refractory metal carbide, and the liquid silicon metal can form silicon carbide from the carbon of the refractory metal carbide.

In another embodiment, the fibers of the fiber preform may be coated with a carbon containing layer prior to infiltrating the refractory precursor. The carbon containing layer can be deposited onto the fibers of the fiber preform by, for example, chemical vapor infiltration (CVI) using methane or by infiltrating with phenolic or other high char-yielding resin with subsequent pyrolization. The carbon containing layer may have a thickness of about 0.1 and about 5 microns or a thickness of about 0.25 and about 2 microns. The carbon containing layer may be substantially pure carbon. The refractory precursor may then be infiltrated into the fiber preform after the carbon containing layer has been formed. The carbon containing layer may be treated with a surfactant to increase wetting of the refractory precursor to the fibers. During the reduction of the refractory precursor such as in a hydrogen containing environment, the refractory metal element may form a refractory metal carbide with the carbon layer. The refractory metal carbide may form a protective coating on the fibers. For example, the refractory metal carbide may form a diffusion barrier that restricts diffusion of elements such as oxygen or silicon from diffusing to the fibers.

The refractory metal silicide may be dispersed throughout the region of the CMC that the solution was infiltrated into the fiber preform. For example, in the region that the solution was infiltrated into, the refractory metal silicide may between about 1% and about 20% by volume of the CMC or may be between about 5% and about 10% by volume of the CMC. The refractory metal silicide may form a coating on the fibers. The refractory metal silicide coating may have a thickness of about 0.1 µm to about 5 µm. Similar to the refractory metal carbide described above, the refractory metal silicide coating may be a barrier layer that restricts diffusion of elements such as oxygen to the fibers.

Since the refractory metal element may form a refractory metal silicide with silicon in the CMC, the CMC may have less silicon metal than a CMC that does not include the refractory metal element. For example, the CMC may have at least about 5% by volume less silicon metal than a CMC would have without use of the refractory precursor to form the CMC. Furthermore, the CMC with the refractory metal element may have less than about 5% by volume residual porosity.

Figure 2:
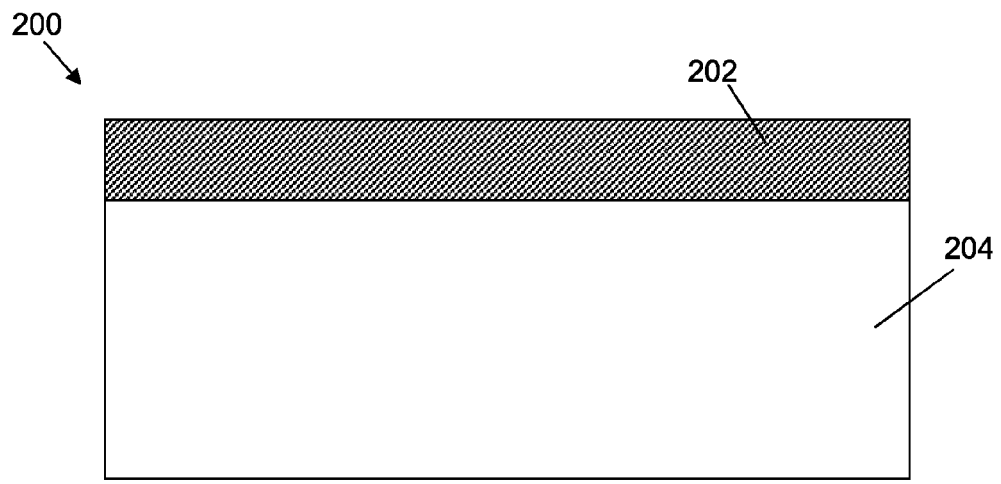
FIG. 2 is a schematic of an example CMC that includes an outer region having refractory metal silicide and an inner region substantially without the refractory metal silicide.

As described above, the refractory metal may only be formed on an outer region of the fiber preform. Thus, as shown in FIG. 2, the CMC 200 may include an outer region 202 having the refractory metal silicide and an inner region 204 having substantially zero refractory metal silicide or being substantially without refractory metal silicide. For example, the inner region 204 may have less than 1 volume % of refractory metal silicide. The refractory metal silicide may be formed on the outer region 202 to improve wear resistance, load distribution and/or machinability of the outer region 202 without the refractory metal silicide affecting properties of the inner region 204. For example, CMC components may be susceptible to cracking during machining when residual silicon metal is present due to residual stress accumulated in the silicon metal. The inclusion of refractory metal silicide can reduce cracking during machining. In another example, replacing the residual silicon metal with refractory metal silicides may increase hardness and wear resistance.

Figure 3:
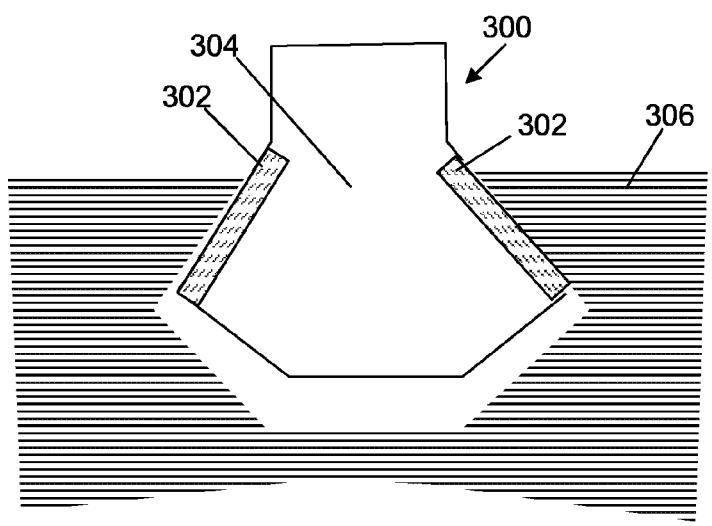
FIG. 3 is a schematic of an example CMC blade attachment that includes outer regions having refractory metal silicide and an inner region substantially without the refractory metal silicide.

FIG. 3 is an example CMC blade attachment 300 having outer regions 302 having refractory metal silicide and an inner region 304 having substantially zero refractory metal silicides. The outer regions 302 may be in contact with a turbine disk fir tree 306 such that the outer regions 302 are sandwiched between the inner region 304 of the CMC blade attachment 300 and the turbine disk fir tree 306. The outer regions 302 may provide improved wear resistance compared to the inner region 304.

Figure 4:
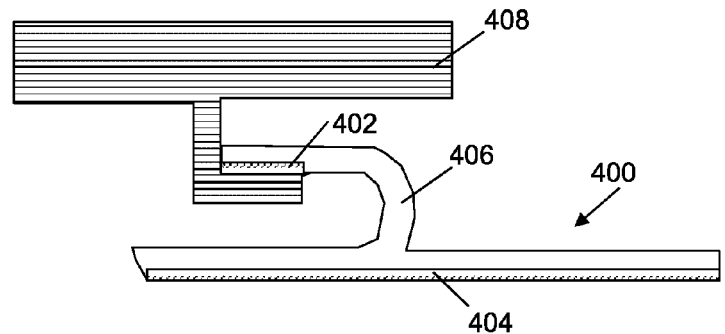
FIG. 4 is a schematic of an example CMC seal segment that includes outer regions that includes refractory metal silicide and an inner region substantially without the refractory metal silicide.

FIG. 4 is an example CMC seal segment 400 having outer regions 402, 404 that include refractory metal silicides and an inner region 406 substantially without refractory metal silicides. The first outer region 402 is adjacent to and/or in contact with a metallic support structure 408 such that the first outer region 402 is sandwiched between the inner region 406 and the metallic support structure 408. The second outer region 404 is configured to be adjacent to rotating turbine blades and form a seal between the CMC seal segment 400 and the turbine blades within a gas flow path. An abradable coating may be applied to the second outer region 404. Although FIG. 4 is illustrated with both the first outer region 402 and the second outer region 404, the CMC seal segment 400 may only include one or the other of the first and second outer regions 402, 404.

The following five prophetic examples are provided to demonstrate the benefits of certain embodiments of the disclosed methods. These examples are discussed for illustrative purposes and should not be construed to limit the scope of the disclosed embodiments.

EXAMPLE 1

A first method of forming a CMC may include infiltration of a refractory precursor solution into the porous preform following SiC slurry infiltration. The method may include the following components and steps.

1) Refractory precursors may include $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.
2) Refractory precursors may be dissolved in water with $H_2O_2$ or $H_3PO_4$ to increase the refractory volume fraction in the precursor.
3) The solubility of the refractory component in the initial precursor solution may be up to about 40% by weight.
4) The precursor solution may be infiltrated by first removing air from the preform through the aid of a vacuum, the solution then surrounds the component, and the system is then returned to about 1 atm in order to create a pressure gradient that forces the solution into the evacuated porosity.

5) The resulting preform may then be dried at 150° C. to remove the solvent and eliminate the hydrate groups from the refractory precursor.
6) The dried preform may then be heat treated at 400-500° C. in air to reduce the ammonium polymolybdate to $MoO_3$.
7) The preform may then be heat-treated at about 450° C. to about 750° C. in an environment with a hydrogen partial pressure between about 0.05 and about 0.5 to reduce the $MoO_3$ to $MoO_2$ or/and $Mo_2O_5$.
8) The preform may then be subjected to a final heat-treatment at about 900° C. to about 1200° C. in an environment with a hydrogen partial pressure between about 0.05 and about 0.5 to reduce the oxide layer to substantially pure molybdenum.
9) The preform may then be melt infiltrated with molten silicon, or a silicon containing alloy, to form a stable $MoSi_2$ barrier layer and a dense composite article. The residual porosity maybe less than about 5% by volume.
10) The resulting composite article may have about 18% less residual Silicon than the equivalent article without the incorporation of the ammonium heptamolybdate tetrahydrate (AHM) solution.

EXAMPLE 2

A second method of forming a CMC may include infiltration of a refractory precursor solution into the porous preform following SiC slurry infiltration. The method may include the following components and steps.
1) Refractory precursors may include $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.
2) Refractory precursors may be dissolved in water with $H_2O_2$ or $H_3PO_4$ to increase the refractory volume fraction in the precursor.
3) The solubility of the refractory component in the initial precursor solution may be up to about 40% by weight.
4) The precursor solution may be infiltrated by first removing air from the preform through the aid of a vacuum, the solution then surrounds the component, and the system is then returned to about 1 atm in order to create a pressure gradient that forces the solution into the evacuated porosity.
5) The resulting preform may then be dried at about 150° C. to remove the solvent and eliminate the hydrate groups from the refractory precursor.
6) The dried preform may then be heat treated at about 400° C. to about 500° C. in air to reduce the ammonium polymolybdate to $MoO_3$.
7) The preform may then be heat-treated at about 450° C. to about 750° C. in an environment with a hydrogen partial pressure between about 0.05 and about 0.5 to reduce the $MoO_3$ to $MoO_2$ or/and $Mo_2O_5$.
8) The preform may then be subject to a final heat-treatment at about 900° C. to about 1150° C. in an environment with a hydrocarbon partial pressure between about 0.05 and about 0.5 to reduce the oxide layer to $Mo_2C$.
9) The preform may then be melt infiltrated with molten silicon, or a silicon containing alloy, to form a stable $MoSi_2$ barrier layer and additional silicon carbide filler that further minimizes the amount of residual elemental silicon in the dense composite article. The residual porosity maybe less than about 5% by volume.
10) The resulting composite article may have about 23% less residual silicon than the equivalent article without the incorporation of the AHM solution.

EXAMPLE 3

A third example method of forming a CMC may include infiltration of a refractory precursor solution into the porous preform prior to SiC slurry infiltration. The method may include the following components and steps.
1) Refractory precursors may include $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.
2) Refractory precursors may be dissolved in water with $H_2O_2$ or $H_3PO_4$ to increase the refractory volume fraction in the precursor.
3) The solubility of the refractory component in the initial precursor solution may be up to about 40% by weight.
4) The precursor solution may be infiltrated by first removing air from the preform through the aid of a vacuum, the solution then surrounds the component, and the system is then returned to about 1 atm in order to create a pressure gradient that forces the solution into the evacuated porosity.
5) The resulting preform may then be dried at about 150° C. to remove the solvent and eliminate the hydrate groups from the refractory precursor.
6) The dried preform may then be heat treated at about 400° C. to about 500° C. in air to reduce the ammonium polymolybdate to $MoO_3$. 7) The preform may then be heat-treated at about 450° C. to about 750° C. in an environment with a hydrogen partial pressure between about 0.05 and about 0.5 to reduce the $MoO_3$ to $MoO_2$ or/and $Mo_2O_5$.
8) The preform may then be subjected to a final heat-treatment at about 900° C. to about 1200° C. in an environment with a hydrogen partial pressure between about 0.05 and about 0.5 to reduce the oxide layer to substantially pure molybdenum.
9) The preform may then be infiltrated with a secondary SiC slurry by first removing air from the preform through the aid of a vacuum, the solution then surrounds the component, and the system is then returned to about 1 atm in order to create a pressure gradient that forces the solution into the evacuated porosity.
10) The preform may then be melt infiltrated with molten silicon, or a silicon containing alloy, to form a stable $MoSi_2$ barrier layer and a dense composite article. The residual porosity maybe less than about 5% by volume.
11) The resulting composite article may have about 37% less residual silicon than the equivalent article without the incorporation of the AHM solution.

EXAMPLE 4

A fourth example method of forming a CMC may include infiltration of a refractory precursor solution into the porous preform prior to SiC slurry infiltration. The method may include the following components and steps.
1) Refractory precursors may include $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.
2) Refractory precursors may be dissolved in water with $H_2O_2$ or $H_3PO_4$ to increase the refractory volume fraction in the precursor.
3) The solubility of the refractory component in the initial precursor solution may be up to about 40% by weight.

4) The precursor solution may be infiltrated by first removing air from the preform through the aid of a vacuum, the solution then surrounds the component, and the system is then returned to about 1 atm in order to create a pressure gradient that forces the solution into the evacuated porosity.

5) The resulting preform may then be dried at about 150° C. to remove the solvent and eliminate the hydrate groups from the refractory precursor.

6) The dried preform may then be heat treated at about 400° C. to about 500° C. in air to reduce the ammonium polymolybdate to $MoO_3$.

7) The preform may then be heat-treated at about 450° C. to about 750° C. in an environment with a hydrogen partial pressure between about 0.05 and about 0.5 to reduce the $MoO_3$ to $MoO_2$ or $Mo_2O_5$.

8) The preform may then be subjected to a final heat-treatment at about 900° C. to about 1150° C. in an environment with a hydrocarbon partial pressure between about 0.05 and about 0.5 to reduce the oxide layer to $Mo_2C$.

9) The preform may then be infiltrated with a secondary SiC slurry by first removing air from the preform through the aid of a vacuum, the solution then surrounds the component, and the system is then returned to about 1 atm in order to create a pressure gradient that forces the solution into the evacuated porosity.

10) The preform may then be melt infiltrated with molten silicon, or a silicon containing alloy, to form a stable $MoSi_2$ barrier layer and additional silicon carbide filler that further minimizes the amount of residual elemental silicon in the dense composite article. The residual porosity maybe less than about 5% by volume.

11) The resulting composite article may have about 44% less residual silicon than the equivalent article without the incorporation of the AHM solution.

EXAMPLE 5

A fifth example may include infiltration of a refractory precursor solution into selective areas of gas turbine engine CMC components after SiC slurry infiltration. The method may include the following components and steps.

1) The selective areas may include areas in contact with a metallic component such as a blade attachment (e.g., FIG. 3) or seal segment hanger (e.g., FIG. 4), or areas that may require extensive machining. The selective areas may include the areas to be coated such as the seal segment flow path 404 where aggressive grit blasting or machining may be performed to activate the surface for the coating process.

2) Refractory precursors may include, but are not limited to: $(NH4)_2Mo_2O_7$, $(NH_4)_6Mo_7O_{24}.4H_2O$, $(NH_4)_2MoO_4$, $(NH_4)_{10}(H_2W_{12}O_{42}).4H_2O$ or a combination thereof.

3) Refractory precursors may be dissolved in water with $H_2O_2$ or $H_3PO_4$ to increase the refractory volume fraction in the precursor.

4) The solubility of the refractory component in the initial precursor solution may be up to about 40% by weight.

5) The precursor solution may be applied by a dip coating, spray-on, or brush-on technique to a SiC slurry infiltrated preform.

6) The SiC slurry may include carbon particle or graphite.

7) The CMC component may be fabricated by slurry cast and melt infiltration process utilizing two or three dimensional woven cloths to form a preform.

8) The preform may be dried at about 80° C. to about 100° C. for about 3 to about 4 hours followed by calcining at about 400° C. to about 500° C. for about 1 hour in air to covert to $MoO_3$ or $WO_3$.

9) $MoO_3$ may be reduced to Mo by hydrogen or to $Mo_2C$ by $CH_4$.

10) $MoO_3$ may be first reduced to $MoO_2$ between about 450° C. to about 650° C. in about 5 to about 50 vol % $H_2$ with the balance being composed of $N_2$ or Ar.

1) $MoO_2$ may be reduced to Mo between about 1000° C. to about 1200° C. in $H_2$ atmosphere.

2) $MoO_2$ may be reduced to $Mo_2C$ between about 1000° C. to about 1200° C. in $CH_4/H_2$ atmosphere.

3) $WO_3$ may be reduced to W in $H_2$ atmosphere and WC in $CH_4/H_2$ atmosphere.

4) Mo, MoC, W, and WC may react with Si during melt infiltration to create a $MoSi_2$ or $WSi_2$ rich surface layer on the preselected area of the component.

5) Reduction may be done as a part of a melt infiltration step.

6) The outer region 202, shown in FIG. 2, may have a thickness of about 1 mils to about 20 mils.

7) The outer region 202 may have at least one compound selected from the group consisting of $MoSi_2$, $WSi_2$, and SiC and alloys thereof and have higher concentration of SiC away from the inner region 204.

Figure 5:
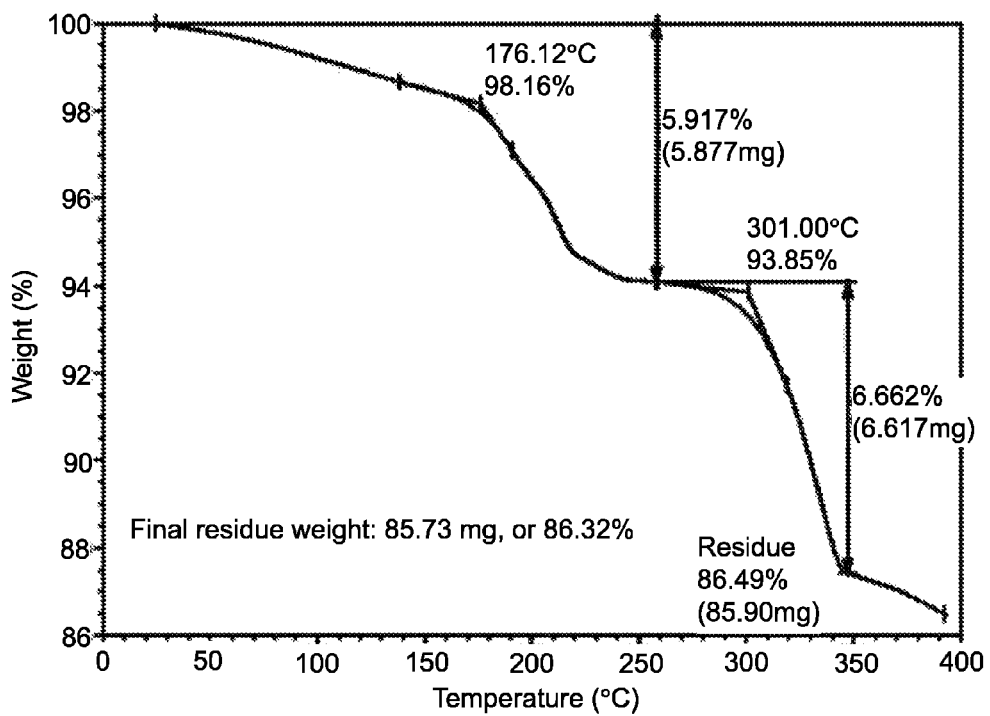
FIG. 5 is a plot of temperature as a function of original AHM weight % retained.

Experimentally, AHM was gradually added to a 24.2 wt % $H_2O_2$/water solution while continuously stirring. Once precipitates started to form, more $H_2O_2$ solution was added to obtain a stable, fully-dissolved solution. The solution was then dried at 150° C. for 2 hours. The resulting weight changes were consistent with the elimination of the solvent solution and the hydrate groups from the initial compound. After calcining at 400° C., thermogravimetric analysis (TGA) data, shown in FIG. 5, indicated 86.5% of the original AHM weight was retained, which is consistent with the expected weight change due to the chemical transformation of AHM to $MoO_3$.

Figure 6:
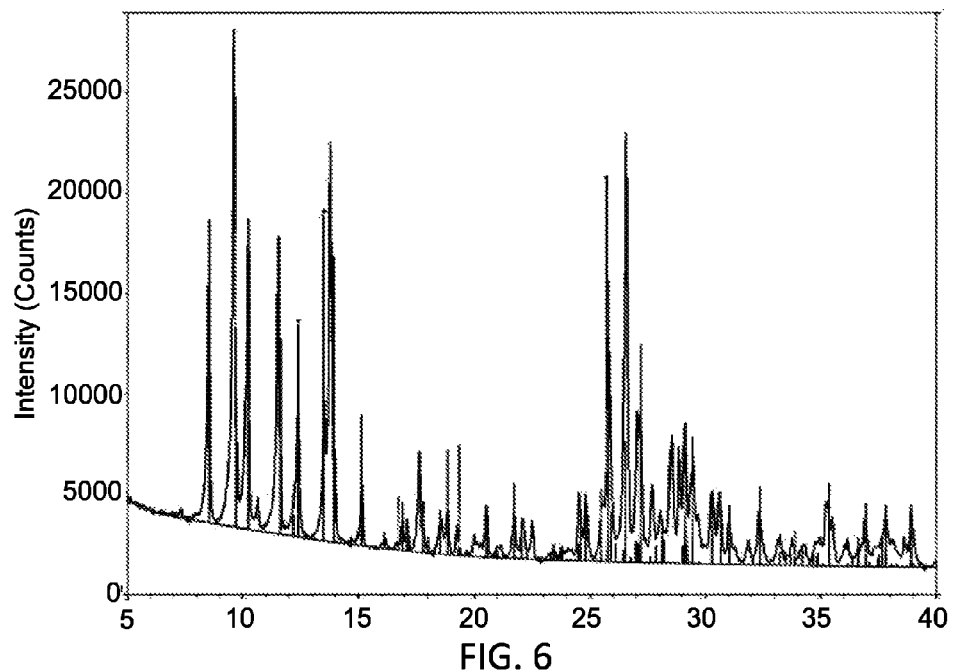
FIG. 6 is an XRD plot of dried AHM solution.
Figure 7:
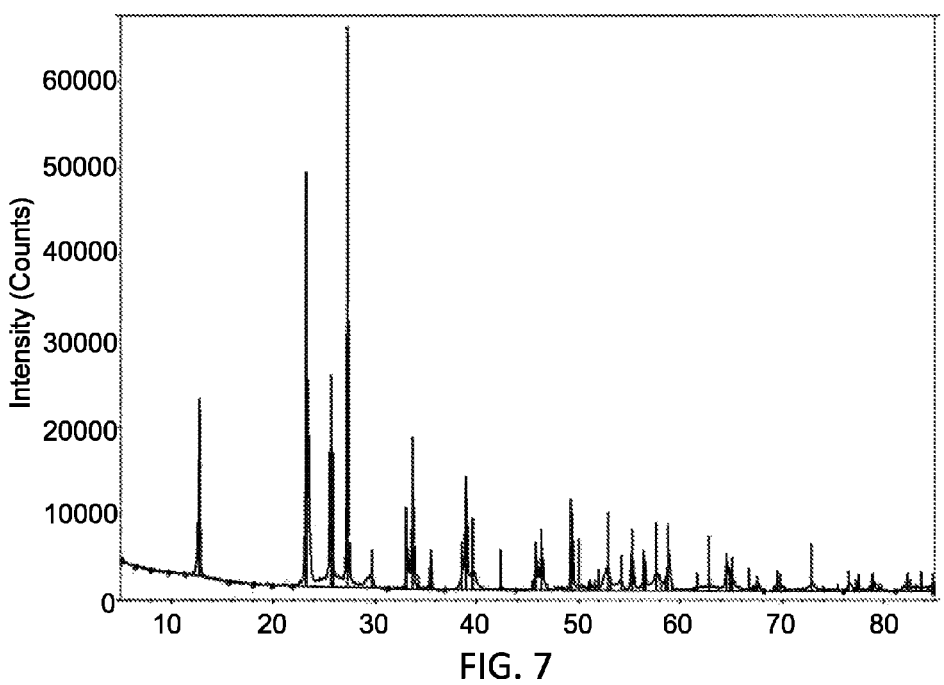
FIG. 7 is an XRD plot of calcined AHM solution.

X-ray diffraction (XRD) was used to characterize the chemical composition of the dried AHM solution as well as the particulate after calcining. The resulting data, XRD of dried AHM solution shown in FIG. 6 and XRD of calcined AHM solution shown in FIG. 7 indicates that the dried solution results in the precipitation of various ammonium polymolybdates which are all converted to $MoO_3$ through the thermal exposure process.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of forming a ceramic matrix composite comprising:
    infiltrating a fiber preform with a solution comprising a refractory precursor in solution with a solvent, the refractory precursor comprising a compound having at least one refractory metal element;
    removing the solvent from the fiber preform; and
    reducing the refractory precursor to form a refractory metal comprising the refractory metal element.

2. The method of claim 1, wherein the refractory metal element comprises molybdenum, tungsten or a combination thereof.

3. The method of claim 1, further comprising melt infiltrating the fiber preform with a molten silicon containing metal or alloy to form the ceramic matrix composite.

4. The method of claim 3, wherein at least some of the refractory metal forms a silicide as a result of the melt infiltration.

5. The method of claim 4, wherein the silicide comprises $MoSi2$, $WSi2$ or a combination thereof.

6. The method of claim 1, wherein the solvent comprises $H_2O$.

7. The method of claim 6, wherein the solvent further comprises $H_2O_2$ or $H_2PO_4$ or a combination thereof.

8. The method of claim 1, wherein the refractory precursor dissociates in the solvent.

9. The method of claim 1, wherein the fiber preform comprises silicon containing refractory fibers.

10. The method of claim 9, wherein the silicon containing refractory fibers comprise silicon carbide.

11. The method of claim 1, wherein the reducing the refractory precursor comprises:

reducing the refractory precursor to form a refractory oxide; and reducing the refractory oxide to form the refractory metal.

12. The method of claim 1, wherein the refractory precursor comprises $(NH_4)_2Mo_2O_7$, $(NH_4)_6Mo_7O_{24} \cdot 4H_2O$, $(NH_4)_2MoO_4$, $(NH_4)_{10}(H_2W_{12}O_{24}) \cdot 4H_2O$ or a combination thereof.

13. The method of claim 1, wherein the refractory metal element comprises at least 20% by weight of the solution.

14. The method of claim 1, wherein the removing the solvent comprises heating the fiber preform.

15. The method of claim 1, further comprising infiltrating the fiber preform with a slurry substantially without the refractory precursor prior to the infiltrating the fiber preform with the solution.

16. The method of claim 15, wherein the infiltrated slurry restricts infiltration of the solution into an interior region of the fiber preform.

17. The method of claim 1, wherein the solution is selectively applied to the fiber preform so that the solution infiltrates only a select region or regions of the fiber preform.

18. The method of claim 17, wherein the solution is applied by dip coating, spray-on, brush technique or a combination thereof.

* * * * *